(12) United States Patent
Kobayashi et al.

(10) Patent No.: US 11,764,605 B2
(45) Date of Patent: Sep. 19, 2023

(54) POWER SUPPLY CONTROL DEVICE AND CONTROL METHOD

(71) Applicant: DENSO TEN Limited, Kobe (JP)

(72) Inventors: Shunsuke Kobayashi, Kobe (JP); Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/699,869

(22) Filed: Mar. 21, 2022

(65) Prior Publication Data

US 2023/0198290 A1 Jun. 22, 2023

(30) Foreign Application Priority Data

Dec. 22, 2021 (JP) .................. 2021-207806

(51) Int. Cl.
| | |
|---|---|
| *B60R 16/033* | (2006.01) |
| *H02J 1/10* | (2006.01) |
| *H02J 9/06* | (2006.01) |
| *H02H 7/20* | (2006.01) |
| *B60L 50/60* | (2019.01) |

(52) U.S. Cl.
CPC .............. *H02J 9/061* (2013.01); *H02H 7/20* (2013.01); *H02J 1/10* (2013.01); *H02J 9/068* (2020.01); *B60L 50/60* (2019.02); *B60R 16/033* (2013.01); *H02J 2310/46* (2020.01); *H02J 2310/48* (2020.01)

(58) Field of Classification Search
CPC ......... B60L 50/60; B60R 16/033; H02H 7/20; H02J 1/10; H02J 7/0024; H02J 7/00712; H02J 7/007182; H02J 7/1423; H02J 7/1438; H02J 7/34; H02J 7/342; H02J 9/04; H02J 9/06; H02J 9/061; H02J 9/068; H02J 2310/46; H02J 2310/48
See application file for complete search history.

(56) References Cited

U.S. PATENT DOCUMENTS

| | | | |
|---|---|---|---|
| 10,840,735 B1* | 11/2020 | Cooper ..................... | H02J 3/32 |
| 2016/0318466 A1* | 11/2016 | Brooks ............... | F02N 11/0866 |
| 2017/0030316 A1* | 2/2017 | Sekiguchi ........... | F02N 11/0866 |
| 2018/0015892 A1* | 1/2018 | Aoki ......................... | H02J 7/00 |
| 2018/0354436 A1* | 12/2018 | Sato ......................... | H02H 7/18 |
| 2020/0216002 A1* | 7/2020 | Mazaki ................. | H02J 7/1423 |

(Continued)

FOREIGN PATENT DOCUMENTS

JP 2019-062727 A 4/2019

*Primary Examiner* — Levi Gannon
(74) *Attorney, Agent, or Firm* — Oliff PLC

(57) ABSTRACT

A power supply control device includes: a first system configured to supply electric power from a first power supply to a first load group; a second system configured to supply electric power from a second power supply to a second load group; a plurality of load switches configured to switch an electric power supply to each load of the first load group and the second load group; and a control unit configured to control the plurality of load switches such that electric power is supplied from the second power supply to a backup load included in at least one of the first load group and the second load group in a predetermined backup state, wherein the control unit detects a state of charge of the second power supply, and increases, in the predetermined backup state, number of the load switches to be connected as the state of charge is higher.

13 Claims, 11 Drawing Sheets

(56) References Cited

U.S. PATENT DOCUMENTS

2021/0132645 A1* 5/2021 Sato ................ H01M 10/44
2021/0138983 A1* 5/2021 Sato ................ H01M 10/44
2022/0063414 A1* 3/2022 Kim ................. B60L 1/00

* cited by examiner

POWER SUPPLY CONTROL DEVICE AND CONTROL METHOD

CROSS-REFERENCE TO RELATED APPLICATION

This application is based on and claims priority under 35 USC 119 from Japanese Patent Application No. 2021-207806 filed on Dec. 22, 2021.

TECHNICAL FIELD

The present invention relates to a technique for supplying electric power from a plurality of systems.

BACKGROUND ART

Conventionally, a power supply system that supplies electric power from another power system to a backup load when an abnormality occurs in some power systems among a plurality of power systems has been known (for example, see JP-A-2019-62727).

SUMMARY OF INVENTION

When a power storage capacity of a power supply that supplies electric power by another power system is lower, electric power that can be supplied to a backup load by the another power system may not be sufficient, and an operation time of the backup load by the another power system may be shortened.

The present invention has been made in view of the above circumstances, and an object of the present invention is to provide a power supply control device and a control method for increasing an operation time of a backup load.

A power supply control device according to an aspect of an embodiment includes a first system, a second system, a plurality of load switches, and a control unit. The first system can supply electric power from a first power supply to a first load group. The second system can supply electric power from a second power supply to a second load group. The plurality of load switches can switch an electric power supply to each load of the first load group and the second load group. The control unit controls the plurality of load switches such that electric power is supplied from the second power supply to a backup load included in at least one of the first load group and the second load group in a predetermined backup state. The control unit detects a state of charge of the second power supply. In the predetermined backup state, the control unit increases the number of load switches to be connected as the state of charge is higher.

According to an aspect of the embodiment, it is possible to increase an operation time of a backup load.

DETAILED DESCRIPTION OF THE INVENTION

Hereinafter, embodiments of a power supply control device and a control method will be described in detail with reference to the accompanying drawings. The present invention is not limited to the following embodiment. Hereinafter, although an example will be described in which a power control device is mounted on a vehicle having an automatic driving function and supplies an electric power ("electric power" may be hereinafter referred to as "power") to a load, the power supply control device according to the embodiment may be mounted on a vehicle that does not have an automatic driving function. In addition, the power supply control device according to the embodiment may be mounted on a device other than a vehicle.

Although a case will be described in the following description in which a vehicle equipped with the power supply control device is an electric vehicle or a hybrid vehicle, the vehicle equipped with the power supply control device may be an engine vehicle that travels using an internal combustion engine.

Figure 1:
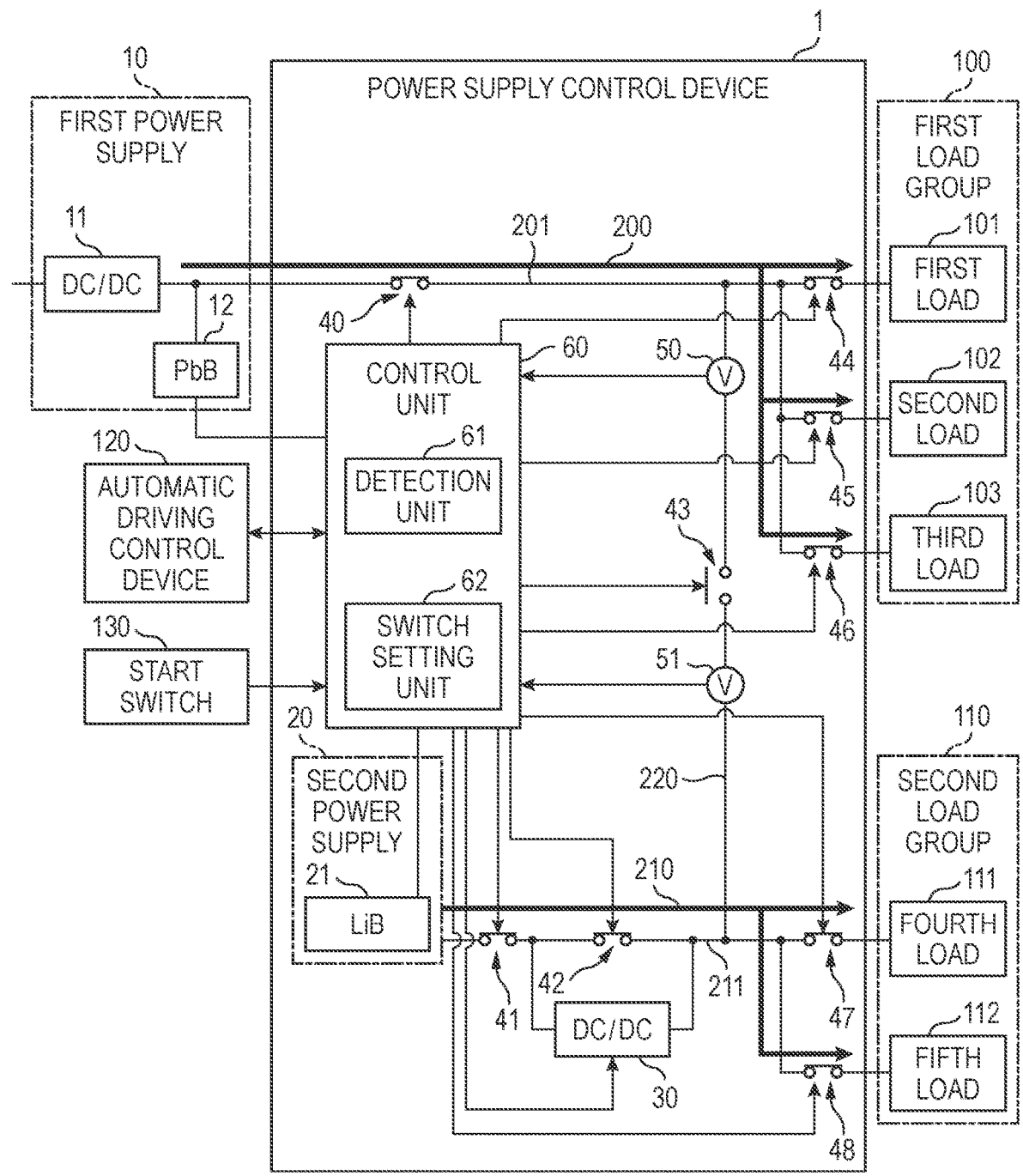
FIG. 1 is a diagram showing a configuration example of a power supply control device according to an embodiment.

FIG. 1 is a diagram showing a configuration example of a power supply control device 1 according to an embodiment. The power supply control device 1 according to the embodiment is connected to a first power supply 10, a first load group 100, a second load group 110, an automatic driving control device 120, and a start switch 130.

The first power supply 10 includes a DC/DC converter 11 (hereinafter referred to as a "DC/DC 11") and a lead battery 12 (hereinafter referred to as a "PbB 12"). A battery of the first power supply 10 may be any secondary battery other than the PbB 12. The first power supply 10 is a main power supply that mainly supplies power to the first load group 100, the second load group 110, and the like.

The DC/DC 11 is connected to a power generator that generates power by converting regenerative energy of a vehicle into power, and transforms and outputs an input voltage from the power generator. When the vehicle includes an engine, the power generator may be an alternator that generates power by converting a rotational force of the engine into power. The DC/DC 11 charges the PbB 12, supplies power to the first load group 100, supplies power to the second load group 110, and charges a second power supply 20 to be described later.

The first load group 100 includes a first load 101, a second load 102, and a third load 103. The first load 101 includes a device used when automatic driving is performed. The first load 101 includes a steering motor, an electric brake device, an in-vehicle camera, a radar, and the like that are operated during automatic driving.

The second load 102 includes a device that is not related to the execution of automatic driving. The second load 102 includes a device that is operated even when the vehicle is parked and the start switch 130 of a power supply system of the vehicle is turned off. The second load 102 includes a door lock control ECU or the like that controls locking of a door of the vehicle. When the in-vehicle camera is a camera that captures an image of the surroundings of the vehicle in a state in which the start switch 130 is turned off, the second load 102 includes the in-vehicle camera.

The third load 103 includes a device that is not related to the execution of automatic driving. The third load 103 includes an outlet in a vehicle cabin, an outlet outside the vehicle cabin, and the like.

The second load 102 and the third load 103 are standby loads that can be operated when the start switch 130 is turned off. The second load 102 and the third load 103 are also backup loads. The second load 102 and the third load 103 are provided with priorities. The priority of the second load 102 is higher than the priority of the third load 103. The priorities of the second load 102 and the third load 103 are stored in a storage area of the power supply control device 1.

The second load group 110 includes a fourth load 111 and a fifth load 112. Similar to the first load 101, the fourth load 111 is a load used when automatic driving is performed. The fourth load 111 is a drive system load such as a steering motor or an electric brake device. The fourth load 111 is a backup load that executes a fail-safe control of an automatic driving control when a ground fault occurs in a first system 200 to be described later.

The fifth load 112 is a load used when automatic driving is performed. The fifth load 112 is a recognition system load such as an in-vehicle camera and a radar. The fifth load 112 is a backup load that executes a fail-safe control of an automatic driving control when a ground fault occurs in the first system 200 to be described later.

The fourth load 111 and the fifth load 112 are backup loads that can be operated by being supplied with power from the second power supply 20 when a ground fault occurs in the first system 200 to be described later. The fourth load 111 and the fifth load 112 are provided with priorities. The priority of the fourth load 111 is higher than the priority of the fifth load 112. The priorities of the fourth load 111 and the fifth load 112 are stored in a storage area of the power supply control device 1.

The automatic driving control device 120 is a control device that controls automatic driving of the vehicle by operating the first load 101 of the first load group 100 and the second load group 110 (the fourth load 111 and the fifth load 112). The automatic driving control device 120 can execute a fail-safe control of an automatic driving control by operating any one of the first load 101 and the second load group 110. When a ground fault occurs in the first system 200 or a second system 210 to be described later, the automatic driving control device 120 controls a system in which no ground fault occurs to execute a fail-safe control of an automatic driving control. The fail-safe control of the automatic driving control is a control of causing the vehicle to retreat to a safe place by automatic driving.

The start switch 130 is a switch for switching a power supply system between an on state and an off state. The start switch 130 may be an ignition switch or an accessory (ACC) switch.

The power supply control device 1 is supplied with power from the first power supply 10 that is provided outside of the power supply control device 1. The power supply control device 1 can supply power supplied from the first power supply 10 that is provided outside of the power supply control device 1 to the first load group 100, the second load group 110, and the second power supply 20 to be described later.

The power supply control device 1 includes the first system 200 and the second system 210. The first system 200 is a system that can supply power from the first power supply 10 to the first load group 100. The second system 210 is a system that can supply power from the second power supply 20 to be described later to the second load group 110 to be described later.

The first system 200 includes a first line 201 that connects the first power supply 10 and the first load group 100. The first line 201 is connected to each of the loads 101 to 103 of the first load group 100.

The second system 210 includes a second line 211 that connects the second power supply 20 and the second load group 110. The second line 211 is connected to each of the loads 111 and 112 of the second load group 110. The first line 201 and the second line 211 are connected by a connection line 220.

The power supply control device 1 includes the second power supply 20, a DC/DC converter 30, a plurality of switches 40 to 48, a first voltage sensor 50, a second voltage sensor 51, and a control unit 60.

The second power supply 20 includes, for example, a lithium ion battery 21 (hereinafter referred to as a "LiB 21"). A battery having a voltage higher than a voltage of the first power supply 10 is selected as the second power supply 20 so that a minimum necessary voltage can be supplied even at a lower temperature. The second power supply 20 is a backup power supply when the first power supply 10 cannot supply power. A battery of the second power supply 20 may be any secondary battery other than the LiB 21.

The DC/DC converter 30 (hereinafter referred to as a "DC/DC 30") is controlled by the control unit 60, and transforms and outputs an input voltage from the first power supply 10 when the LiB 21 is charged. When the LiB 21 is not charged, the DC/DC 30 is in a non-operating state.

The plurality of switches 40 to 48 include a first battery switch 40, a second battery switch 41, a backup switch 42, an inter-system switch 43, and first to fifth load switches 44 to 48. The first battery switch 40 is provided on the first line 201 that can connect the first power supply 10 and the first load group 100.

The first battery switch 40 is a switch that connects or disconnects the first power supply 10 and the first system 200, and is a switch that switches a power supply from the first power supply 10 between a supply state and a non-supply state. When the first battery switch 40 is turned on, both ends of the first battery switch 40 are electrically connected. When the first battery switch 40 is turned off, an electrical connection between both ends of the first battery switch 40 is disconnected, that is, cut off. The same applies to the second battery switch 41 to the fifth load switch 48.

The second battery switch 41 is provided on the second line 211 that can connect the second power supply 20 and the second load group 110. The second battery switch 41 is a switch that connects or disconnects the second power supply 20 and the second system 210, and is a switch that switches a power supply to the second power supply 20 between a supply state and a non-supply state and switches a power supply from the second power supply 20 between a supply state and a non-supply state.

The backup switch 42 is provided on the second line 211. The backup switch 42 is provided in parallel with the DC/DC 30. When the backup switch 42 is turned on, a current does not flow through the DC/DC 30 but flows through the backup switch 42. When the backup switch 42 is turned off, the current flows through the DC/DC 30. That is, the backup switch 42 is a switch that switches whether the current flows through the DC/DC 30.

The inter-system switch 43 is provided on the connection line 220 that connects the first line 201 and the second line 211. The inter-system switch 43 is a switch that can connect or disconnect the first line 201 and the second line 211. That is, the inter-system switch 43 is a switch that connects or disconnects the first system 200 and the second system 210.

The first load switch 44 is provided on the first line 201. The first load switch 44 is a switch that switches whether to supply power to the first load 101.

The second load switch 45 is provided on the first line 201. The second load switch 45 is a switch that switches whether to supply power to the second load 102.

The third load switch 46 is provided on the first line 201. The third load switch 46 is a switch that switches whether to supply power to the third load 103.

The fourth load switch 47 is provided on the second line 211. The fourth load switch 47 is a switch that switches whether to supply power to the fourth load 111.

The fifth load switch 48 is provided on the second line 211. The fifth load switch 48 is a switch that switches whether to supply power to the fifth load 112.

The first load switch 44 to the fifth load switch 48 are load switches capable of switching whether to supply power to the loads 101, 102, 103, 111, and 112 of the first load group 100 and the second load group 110.

The first voltage sensor 50 is provided on the connection line 220. Specifically, the first voltage sensor 50 is provided on the connection line 220 between the inter-system switch 43 and the first line 201. The first voltage sensor 50 detects a voltage of the first system 200. The second voltage sensor 51 is provided on the connection line 220. Specifically, the second voltage sensor 51 is provided on the connection line 220 between the inter-system switch 43 and the second line 211. The second voltage sensor 51 detects a voltage of the second system 210.

The control unit 60 includes various circuits or a microcomputer provided with a central processing unit (CPU), a read only memory (ROM), a random access memory (RAM), and the like. The control unit 60 may be configured with hardware such as an application specific integrated circuit (ASIC) or a field programmable gate array (FPGA). The control unit 60 includes a detection unit 61 that functions when the CPU executes a program stored in the ROM using the RAM as a work area, and a switch setting unit 62. The control unit 60 controls an operation of the power supply control device 1. The control unit 60 is operated when the control unit 60 is supplied with power from the first power supply 10 and the second power supply 20. That is, the control unit 60 can be operated by being supplied with power from the first power supply 10 or the second power supply 20. The functions of the detection unit 61 and the switch setting unit 62 may be divided into a plurality of functions.

In a predetermined backup state, the control unit 60 controls a plurality of load switches such that power is supplied from the second power supply 20 to backup loads included in at least one of the first load group 100 and the second load group 110. Specifically, in the predetermined backup state, the control unit 60 increases the number of load switches to be connected as a state of charge of the second power supply 20 is higher.

The detection unit 61 detects the predetermined backup state. The predetermined backup state includes a state in which a power failure occurs in the first system 200. The predetermined backup state includes a state in which the start switch 130 is turned off.

The power failure is, for example, a ground fault. That is, the detection unit 61 detects whether a ground fault occurs in the first system 200. The detection unit 61 determines whether a voltage detected by the first voltage sensor 50 is within a normal range in a normal state in which the first battery switch 40 and the inter-system switch 43 are turned on and the backup switch 42 is turned off. The normal range is a range indicated by a voltage detected by the first voltage sensor 50 when no power failure occurs in the first system 200. For example, the normal range is a range in which the voltage detected by the first voltage sensor 50 is equal to or higher than a predetermined voltage set in advance.

When the voltage detected by the first voltage sensor 50 is not within the normal range in the normal state, for example, when the voltage is smaller than the predetermined voltage, the detection unit 61 detects that a ground fault occurs in the first system 200.

When the voltage detected by the first voltage sensor 50 is within the normal range in the normal state, the detection unit 61 detects that no ground fault occurs in the first system 200.

In the normal state, the detection unit 61 can detect the occurrence of a power failure in the second system 210 based on the voltage detected by the second voltage sensor 51.

The detection unit 61 determines whether the start switch 130 is turned on or turned off based on a signal acquired from the start switch 130.

The detection unit 61 acquires voltage information of the second power supply 20 measured by a measurement device provided in the second power supply 20, and detects a state of charge of the second power supply 20. Specifically, the detection unit 61 detects a state of charge (SOC) of the second power supply 20. The detection unit 61 may acquire current information and temperature information in addition to the voltage information, and may detect a state of charge of the second power supply 20 using the current information or the like. The detection unit 61 periodically detects a state of charge of the second power supply 20 at the time of starting the vehicle when the start switch 130 is turned on and during a subsequent operation.

When a state of charge of the second power supply 20 is detected, the detection unit 61 determines whether the state of charge of the second power supply 20 is a first state of charge. The first state of charge is a state in which a power storage capacity of the LiB 21 is equal to or larger than a first predetermined capacity. The first predetermined capacity is a value set in advance. The first predetermined capacity is a capacity at which the fourth load 111 and the fifth load 112 of the second load group 110 can execute a fail-safe control of an automatic driving control when a ground fault occurs in the first system 200 during automatic driving. The first predetermined capacity is, for example, a capacity of 50% of a fully charged power storage capacity. When the detection unit 61 determines that a state of charge of the second power supply 20 is the first state of charge, the detection unit 61 permits automatic driving.

When a state of charge of the second power supply 20 is detected, the detection unit 61 determines whether the state of charge of the second power supply 20 is a second state of charge. The second state of charge is a state in which the power storage capacity of the LiB 21 is less than the first predetermined capacity and is equal to or larger than a second predetermined capacity. The second predetermined capacity is a value set in advance and is smaller than the first predetermined capacity. That is, the second state of charge is lower than the first state of charge. The second predetermined capacity is a capacity at which the fail-safe control of the automatic driving control when the fifth load 112 is operated may not be executed until the fail-safe control of the automatic driving control executed by the fourth load 111 is completed, that is, until the vehicle is stopped, in a case where a ground fault occurs in the first system 200 during automatic driving. The second predetermined capacity is, for example, a capacity of 30% of a fully charged power storage capacity. When the detection unit 61 determines that a state of charge of the second power supply 20 is the second state of charge, the detection unit 61 permits automatic driving.

When a state of charge of the second power supply 20 is detected, the detection unit 61 determines whether the state of charge of the second power supply 20 is a third state of charge. The third state of charge is a state in which a power storage capacity of the LiB 21 is less than the second predetermined capacity. The third state of charge is a state in which the fail-safe control of the automatic driving control when only the fourth load 111 is driven cannot be executed until the fail-safe control of the automatic driving control is completed, that is, until the vehicle is stopped, in a case where a ground fault occurs in the first system 200 during automatic driving. Therefore, when the detection unit 61 determines that a state of charge of the second power supply 20 is the third state of charge, the detection unit 61 prohibits automatic driving.

When a state of charge of the second power supply 20 during driving of the vehicle is detected, the detection unit 61 detects whether a state of charge of the second power supply 20 is any one of the first state of charge to the third state of charge, and determines whether automatic driving is permitted according to a detection result. Specifically, when the detection unit 61 determines that a state of charge of the second power supply 20 is the first state of charge or the second state of charge during manual driving after the start switch 130 is turned on, the detection unit 61 permits automatic driving, and when the detection unit 61 determines that a state of charge of the second power supply 20 is the third state of charge, the detection unit 61 prohibits automatic driving. In a case where the detection unit 61 permits automatic driving, when automatic driving is started, the detection unit 61 continues to detect a state of charge of the second power supply 20, and further detects a state of charge of the second power supply 20 even after a ground fault is detected during automatic driving. When a ground fault of the first system 200 is detected during automatic driving, the switches 40 to 48 to be described later are controlled in accordance with a state of charge of the second power supply 20 at that time.

The detection unit 61 determines whether the vehicle is in automatic driving. The detection unit 61 determines whether automatic driving is performed by the automatic driving control device 120.

When the start switch 130 is turned off, the detection unit 61 detects a state of charge of the second power supply 20 during this period.

Specifically, when the start switch 130 is turned off, the detection unit 61 determines whether a state of charge of the second power supply 20 is a fourth state of charge. The fourth state of charge is a state in which a power storage capacity of the LiB 21 is equal to or larger than a third predetermined capacity. The third predetermined capacity is a value set in advance. The third predetermined capacity is, for example, a capacity of 50% of a fully charged power storage capacity.

When the start switch 130 is turned off, the detection unit 61 determines whether a state of charge of the second power supply 20 is a fifth state of charge. The fifth state of charge is a state in which a power storage capacity of the LiB 21 is less than the third predetermined capacity and is equal to or larger than a fourth predetermined capacity. The fourth predetermined capacity is a value set in advance and is smaller than the third predetermined capacity. The fourth predetermined capacity is, for example, 20% of a fully charged power storage capacity.

When the start switch 130 is turned off, the detection unit 61 determines whether a state of charge of the second power supply 20 is a sixth state of charge. The sixth state of charge is a state in which a power storage capacity of the LiB 21 is less than the fourth predetermined capacity.

Figure 2:
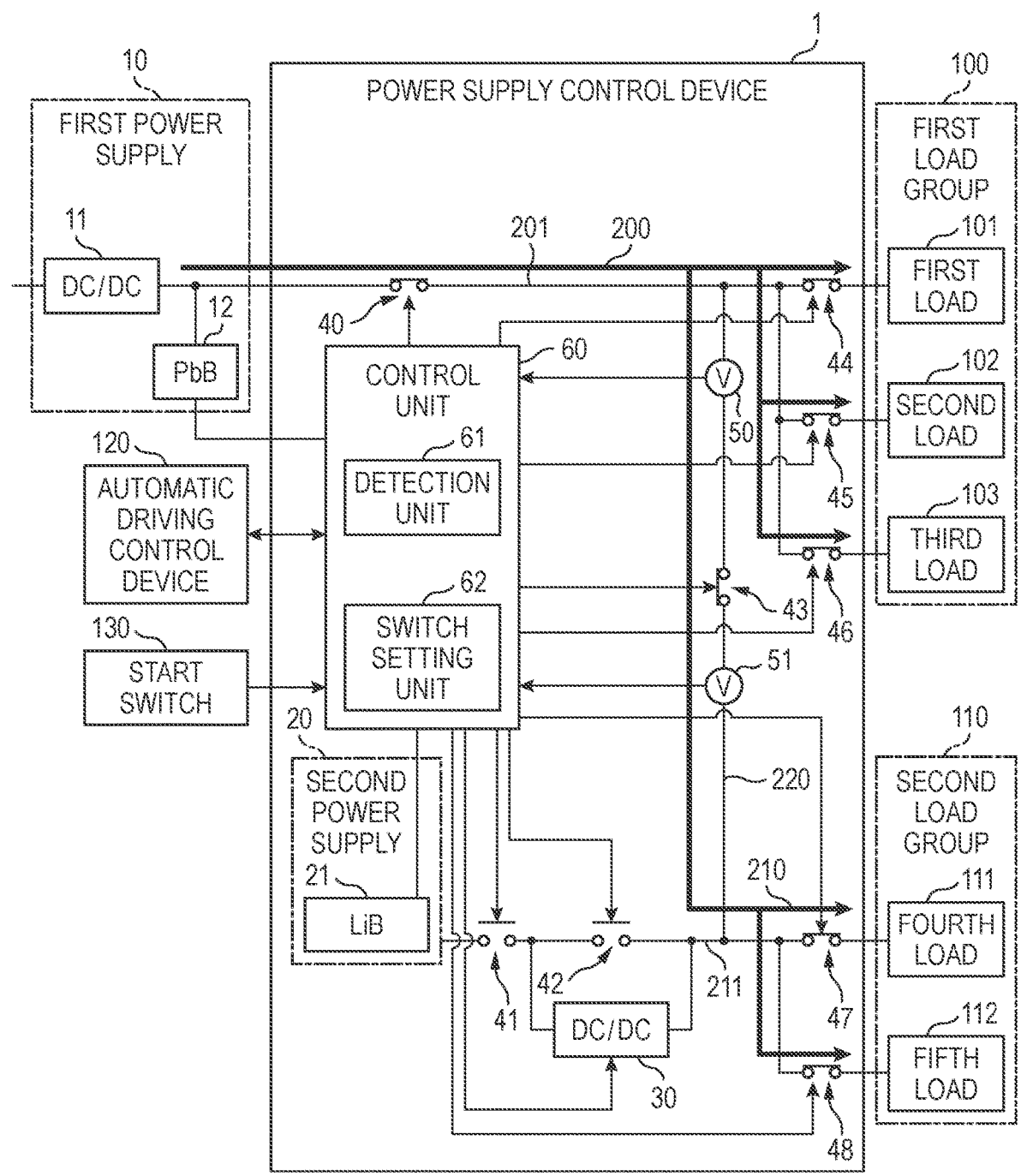
FIG. 2 is a diagram showing a power supply supplied by a first power supply.

The switch setting unit 62 sets each of the switches 40 to 48 to ON or OFF and switches ON and OFF of each of the switches 40 to 48. When it is not the predetermined backup state and power is supplied from the first power supply 10 to the first load group 100 and the second load group 110, the switch setting unit 62 turns on the first battery switch 40, the inter-system switch 43, and the first load switch 44 to the fifth load switch 48. That is, in a normal traveling state, the switch setting unit 62 turns on the first battery switch 40, the inter-system switch 43, and the first load switch 44 to the fifth load switch 48. As a result, power is supplied from the first power supply 10 to the loads 101 to 103 of the first load group 100 by the first system 200 as shown in FIG. 2. FIG. 2 is a diagram showing a power supply supplied by the first power supply 10. Power is supplied from the first power supply 10 to the loads 111 and 112 of the second load group 110 by the first system 200 and the second system 210. Specifically, power is supplied from the first power supply 10 to the loads 111 and 112 of the second load group 110 via the first line 201, the connection line 220, and the second line 211.

When the second power supply 20 is charged, the switch setting unit 62 turns on the second battery switch 41 and turns off the backup switch 42. The control unit 60 drives the DC/DC 30. As a result, power is supplied from the first power supply 10 to the LiB 21 of the second power supply 20, and the LiB 21 is charged. When the LiB 21 is charged, the backup switch 42 is turned off, and the current flows through the DC/DC 30 to the LiB 21. When the LiB 21 of the second power supply 20 is not charged, the switch setting unit 62 turns off the second battery switch 41.

When a ground fault occurs in the first system 200 during automatic driving and a state of charge of the second power supply 20 is the first state of charge, the switch setting unit 62 controls the switches 40 to 48 such that power is supplied from the second power supply 20 to all loads used for automatic driving by the second system 210. The switch setting unit 62 controls the switches 40 to 48 such that power is supplied from the second power supply 20 to the fourth load 111 and the fifth load 112 by the second system 210.

Figure 3:
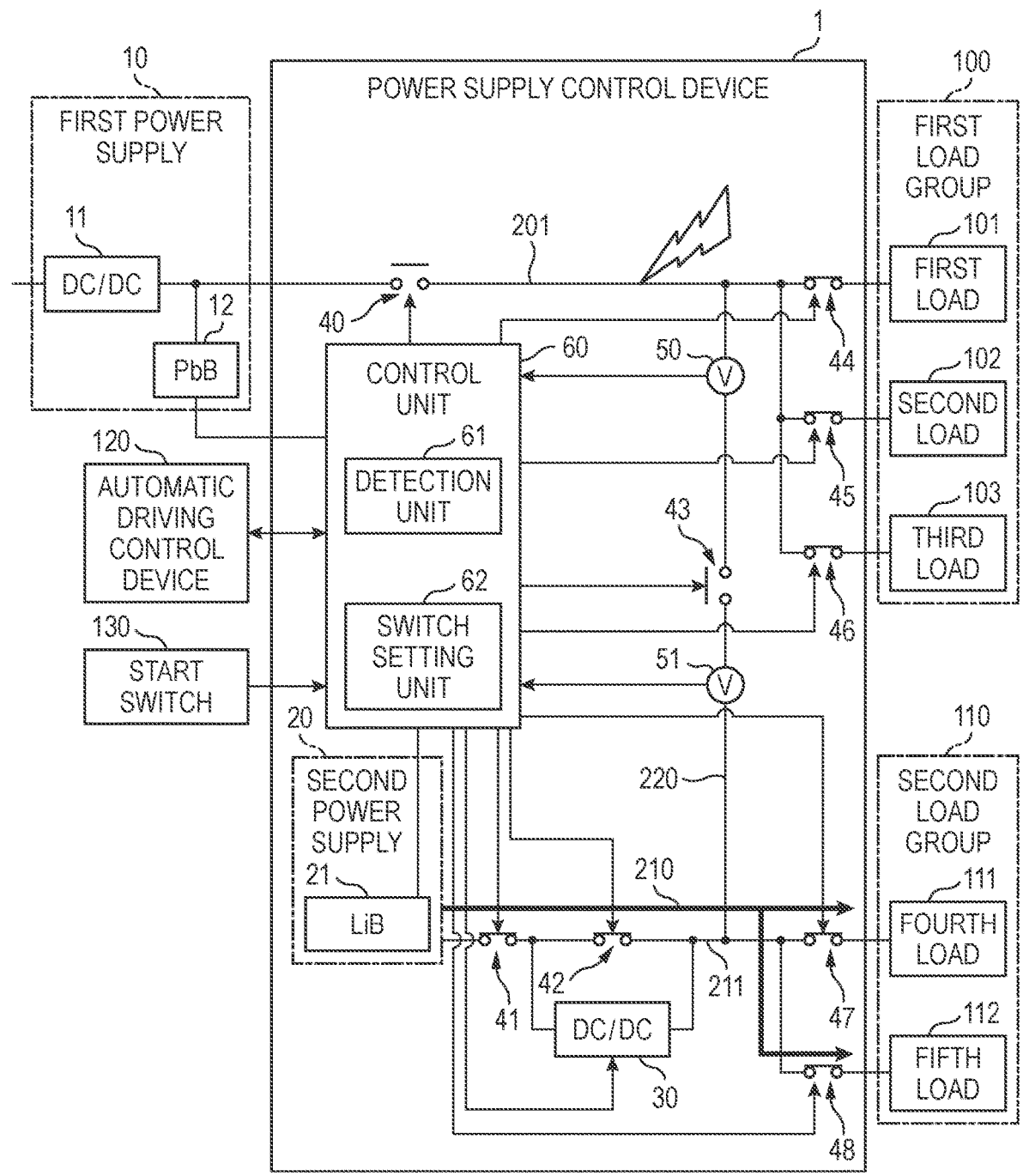
FIG. 3 is a diagram showing a power supply in a case where a ground fault occurs in a first system and a state of charge of a second power supply is a first state of charge.

Specifically, the switch setting unit 62 turns off the first battery switch 40 and the inter-system switch 43. Further, the switch setting unit 62 turns on the second battery switch 41, the backup switch 42, the fourth load switch 47, and the fifth load switch 48. As a result, power is not supplied from the first power supply 10 to the first load group 100 and the second load group 110 as shown in FIG. 3. In addition, power is supplied from the second power supply 20 to the fourth load 111 and the fifth load 112 by the second system 210. FIG. 3 is a diagram showing a power supply in a case where a ground fault occurs in the first system 200 and a state of charge of the second power supply 20 is the first state of charge.

When a ground fault occurs in the first system 200 and a state of charge of the second power supply 20 is the first state of charge, the switch setting unit 62 controls the fourth load switch 47 and the fifth load switch 48 which are load switches and turns on the fourth load switch 47 and the fifth load switch 48. As a result, power is supplied from the second power supply 20 to the fourth load 111 and the fifth load 112, that is, all backup loads included in the second load group 110.

When the backup switch 42 is turned on, the current does not flow through the DC/DC 30, but flows through the backup switch 42 to the fourth load 111 and the fifth load 112.

Figure 4:
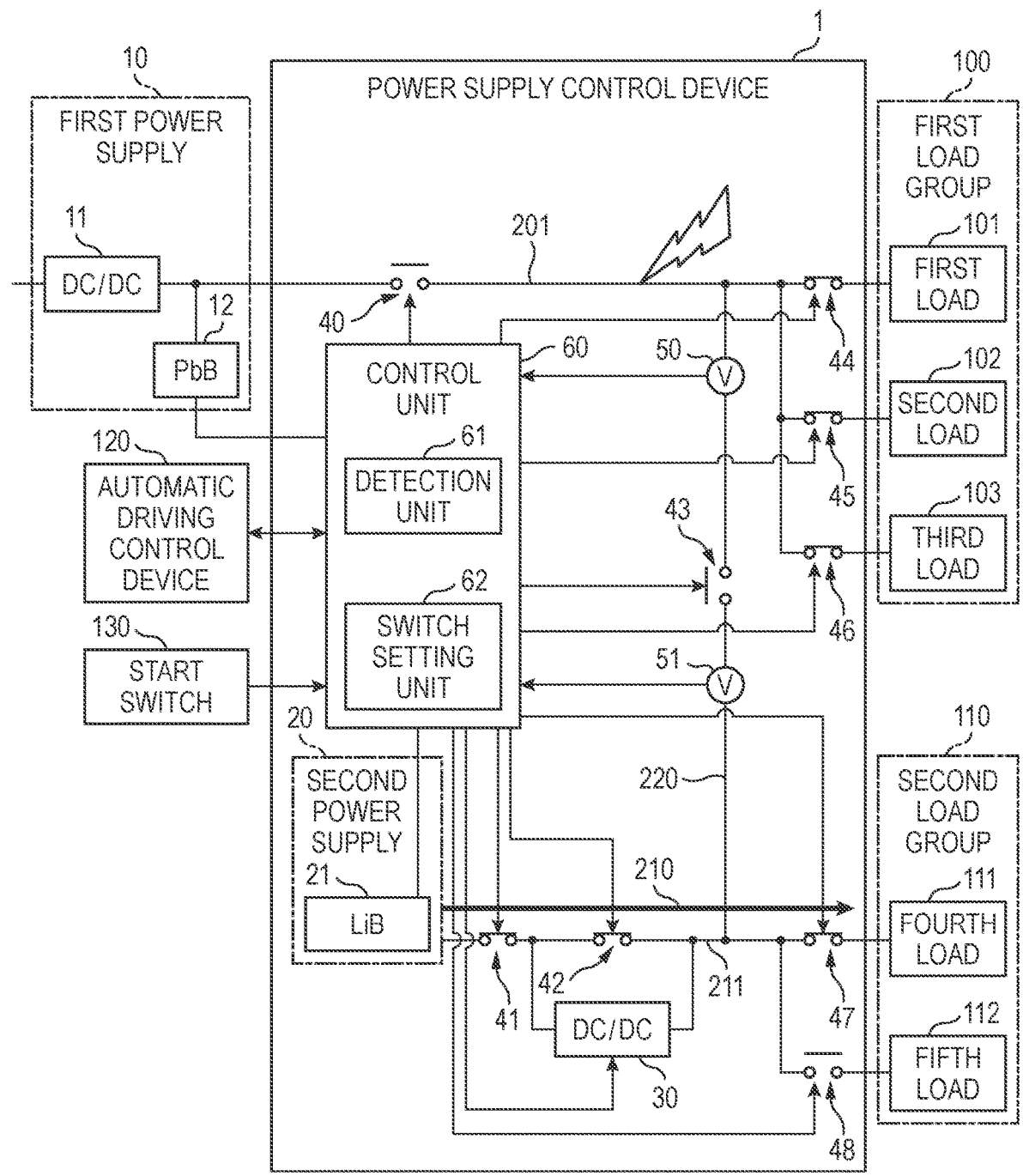
FIG. 4 is a diagram showing a power supply in a case where a ground fault occurs in the first system and a state of charge of the second power supply is a second state of charge.

When a ground fault occurs in the first system 200 during automatic driving and a state of charge of the second power supply 20 is the second state of charge, the switch setting unit 62 controls the switches 40 to 48 such that power is supplied from the second power supply 20 to the fourth load 111 by the second system 210. That is, the switch setting unit 62 controls the switches 40 to 48 such that power is supplied to the fourth load 111 with a higher priority among the loads used for automatic driving. Specifically, the switch setting unit 62 turns off the first battery switch 40, the inter-system switch 43, and the fifth load switch 48. Further, the switch setting unit 62 turns on the second battery switch 41, the backup switch 42, and the fourth load switch 47. As a result, power is not supplied from the first power supply 10 to the first load group 100 and the second load group 110 as shown in FIG. 4. Power is supplied from the second power supply 20 to the fourth load 111 by the second system 210. FIG. 4 is a diagram showing a power supply in a case where a ground fault occurs in the first system 200 and a state of charge of the second power supply 20 is the second state of charge.

When a ground fault occurs in the first system 200 and a state of charge of the second power supply 20 is the second state of charge, the switch setting unit 62 controls the fourth load switch 47 that is a load switch and turns on the fourth load switch 47. The switch setting unit 62 controls the fifth load switch 48 that is a load switch and turns off the fifth load switch 48. As a result, power is supplied from the second power supply 20 to the fourth load 111 with a higher priority among backup loads included in the second load group 110.

In a case where a state of charge of the second power supply 20 is the third state of charge during manual driving, the switch setting unit 62 performs the same switch control as the switch control in the normal traveling state shown in FIG. 2, so that the detection unit 61 prohibits automatic driving.

Figure 5:
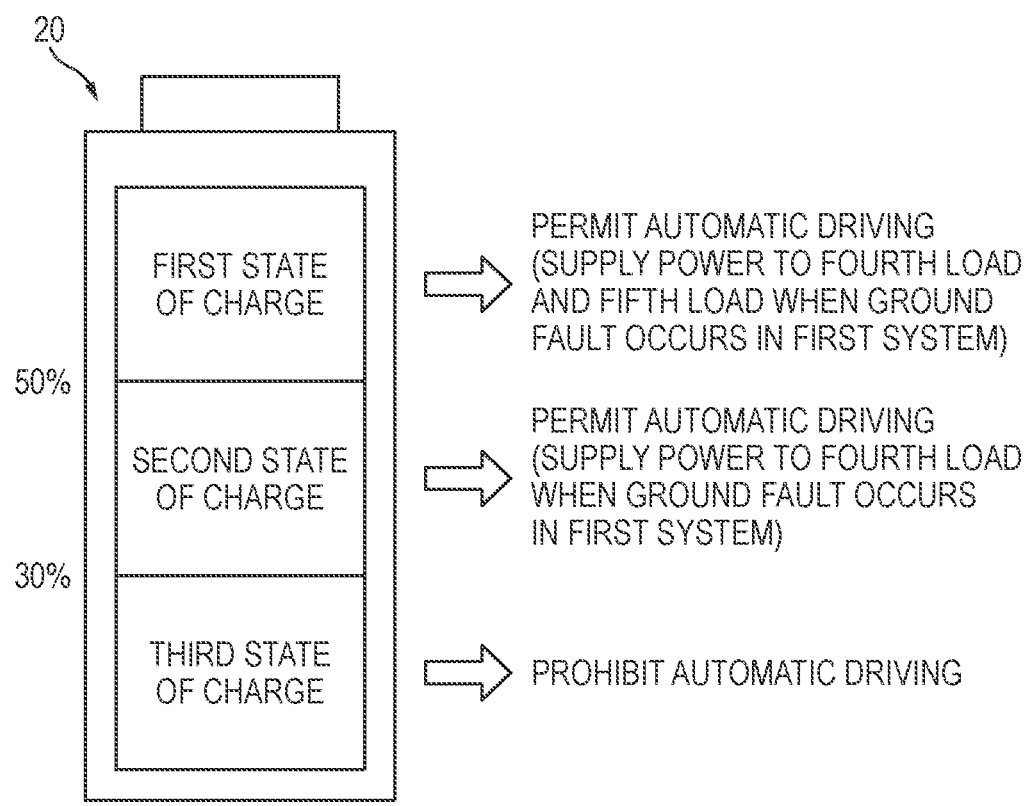
FIG. 5 is a diagram showing a relationship among a state of charge of the second power supply, whether an automatic driving control is permitted, and a fail-safe control.

As shown in FIG. 5, the power supply control device 1 determines whether automatic driving is permitted in accordance with a state of charge of the second power supply 20 during manual driving, and switches to execute a fail-safe control of an automatic driving control using the second load group 110 when a ground fault occurs in the first system 200 during automatic driving. FIG. 5 is a diagram showing a relationship among a state of charge of the second power supply 20, whether an automatic driving control is permitted, and a fail-safe control.

In a case where automatic driving is permitted and a ground fault occurs in the first system 200 during automatic driving, when a state of charge of the second power supply 20 is the first state of charge, the fail-safe control of the automatic driving control is executed. In this case, the fourth load switch 47 and the fifth load switch 48 are turned on, and power is supplied from the second power supply 20 to the fourth load 111 and the fifth load 112, that is, all loads used for automatic driving.

In a case where automatic driving is permitted and a ground fault occurs in the first system 200 during automatic driving, when a state of charge of the second power supply 20 is the second state of charge, the fail-safe control of the automatic driving control is executed. In this case, the fourth load switch 47 is turned on and the fifth load switch 48 is turned off, and power is supplied from the second power supply 20 to the fourth load 111 with a higher priority among the loads used for automatic driving, and power is not supplied to the fifth load 112 with a lower priority.

When a state of charge of the second power supply 20 is the third state of charge, automatic driving is not permitted.

The following two control methods can be considered for the switches 40 to 48 when a ground fault occurs in the first system 200.

In a first control method, the switch setting unit 62 determines to turn on a load switch in accordance with a state of charge of the second power supply 20 at the time when a ground fault occurs in the first system 200, and thereafter the switch setting unit 62 maintains an ON or OFF state of each of the switches 40 to 48 until the fail-safe control is completed. As a result, the automatic driving control device 120 can execute an appropriate fail-safe control until the fail-safe control is completed in accordance with a state of charge of the second power supply 20 at the time when a ground fault occurs.

In a second control method, the switch setting unit 62 determines to turn on a load switch in accordance with a state of charge of the second power supply 20 at the time when a ground fault occurs in the first system 200, and thereafter the switch setting unit 62 determines to turn on a load switch in accordance with a state of charge of the second power supply 20 during the fail-safe control. Specifically, when a state of charge of the second power supply 20 at the time when a ground fault occurs in the first system 200 is the first state of charge, the fourth load switch 47 and the fifth load switch 48 are turned on and the fail-safe control is performed. When a state of charge of the second power supply 20 is lowered to the second state of charge during the fail-safe control, the switch setting unit 62 turns off the fifth load switch 48 and the fail-safe control is performed only by the fourth load 111 with a higher priority. Thereafter, even when a state of charge of the second power supply 20 is lowered to the third state of charge, the fail-safe control is continued to be executed only by the fourth load 111. When a state of charge of the second power supply 20 at the time when a ground fault occurs in the first system 200 is the second state of charge, the switch setting unit 62 turns on the fourth load switch 47 and the fail-safe control is performed only by the fourth load 111 with a higher priority. As a result, it is possible to perform a fail-safe control for a longer time by a load with a higher priority.

A control of the switch setting unit 62 during traveling of the vehicle when the start switch 130 is turned on is described above, and a control of the switch setting unit 62 during parking of the vehicle when the start switch 130 is turned off will be described as follows.

Figure 6:
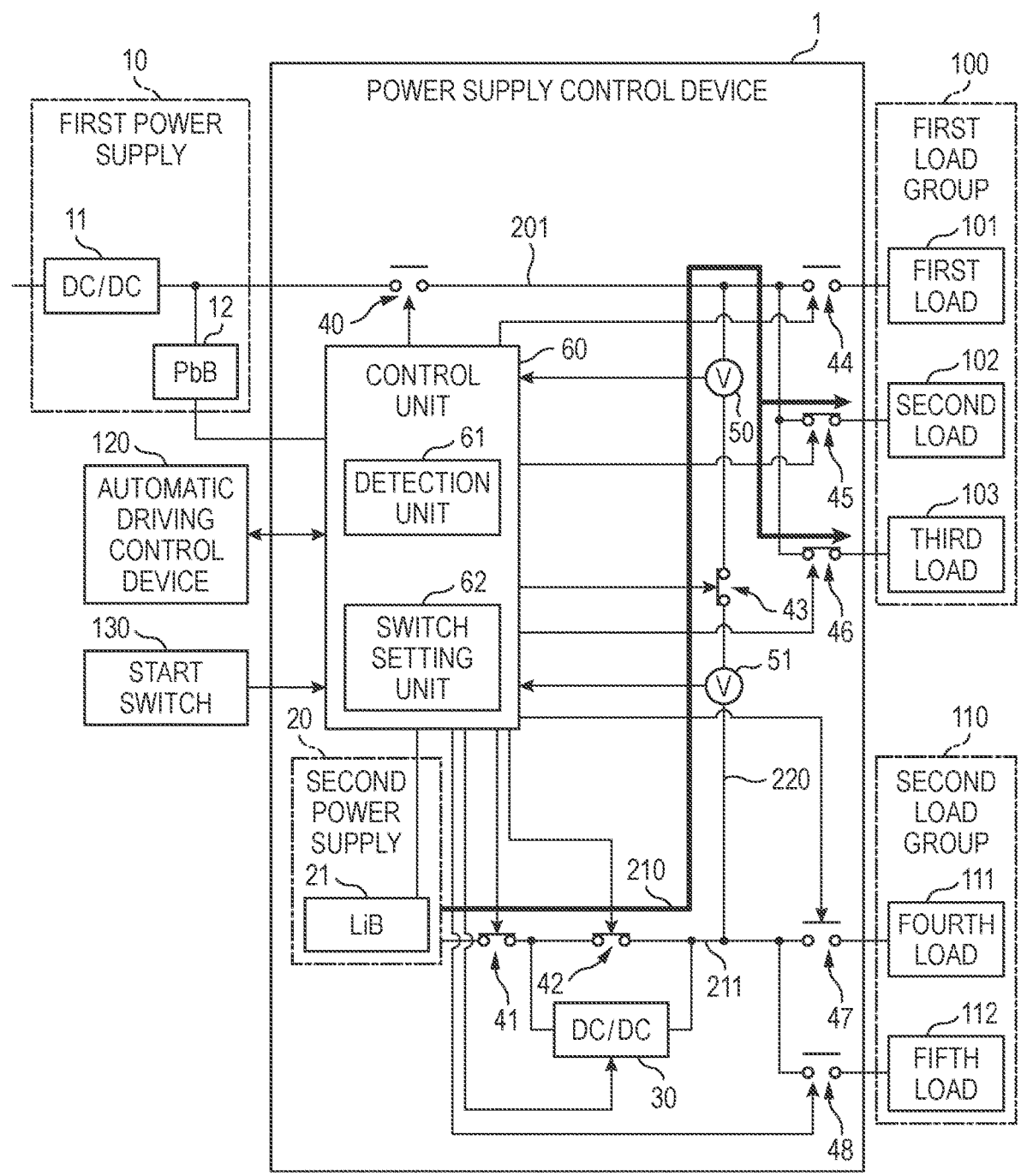
FIG. 6 is a diagram showing an electric power supply in a case where a start switch is turned off and a state of charge of the second power supply is a fourth state of charge.

When the start switch 130 is turned off and a state of charge of the second power supply 20 is the fourth state of charge, the switch setting unit 62 controls the switches 40 to 48 such that power is supplied from the second power supply 20 to all loads that are operated during a period in which the start switch 130 is turned off. That is, the switch setting unit 62 controls the switches 40 to 48 such that power is supplied from the second power supply 20 to the second load 102 and the third load 103. Specifically, the switch setting unit 62 turns off the first battery switch 40, the first load switch 44, the fourth load switch 47, and the fifth load switch 48. Further, the switch setting unit 62 turns on the second battery switch 41, the backup switch 42, the inter-system switch 43, the second load switch 45, and the third load switch 46. As a result, power is not supplied from the first power supply 10 to the first load group 100 and the second load group 110 as shown in FIG. 6. Power is supplied from the second power supply 20 to the second load 102 and the third load 103 of the first load group 100. FIG. 6 is a diagram showing a power supply in a case where the start switch 130 is turned off and a state of charge of the second power supply 20 is the fourth state of charge.

When the start switch 130 is turned off and a state of charge of the second power supply 20 is the fourth state of charge, the switch setting unit 62 controls the second load switch 45 and the third load switch 46 that are load switches and turns on the second load switch 45 and the third load switch 46. As a result, power is supplied from the second power supply 20 to all of the second load 102 and the third load 103 that are standby loads.

Figure 7:
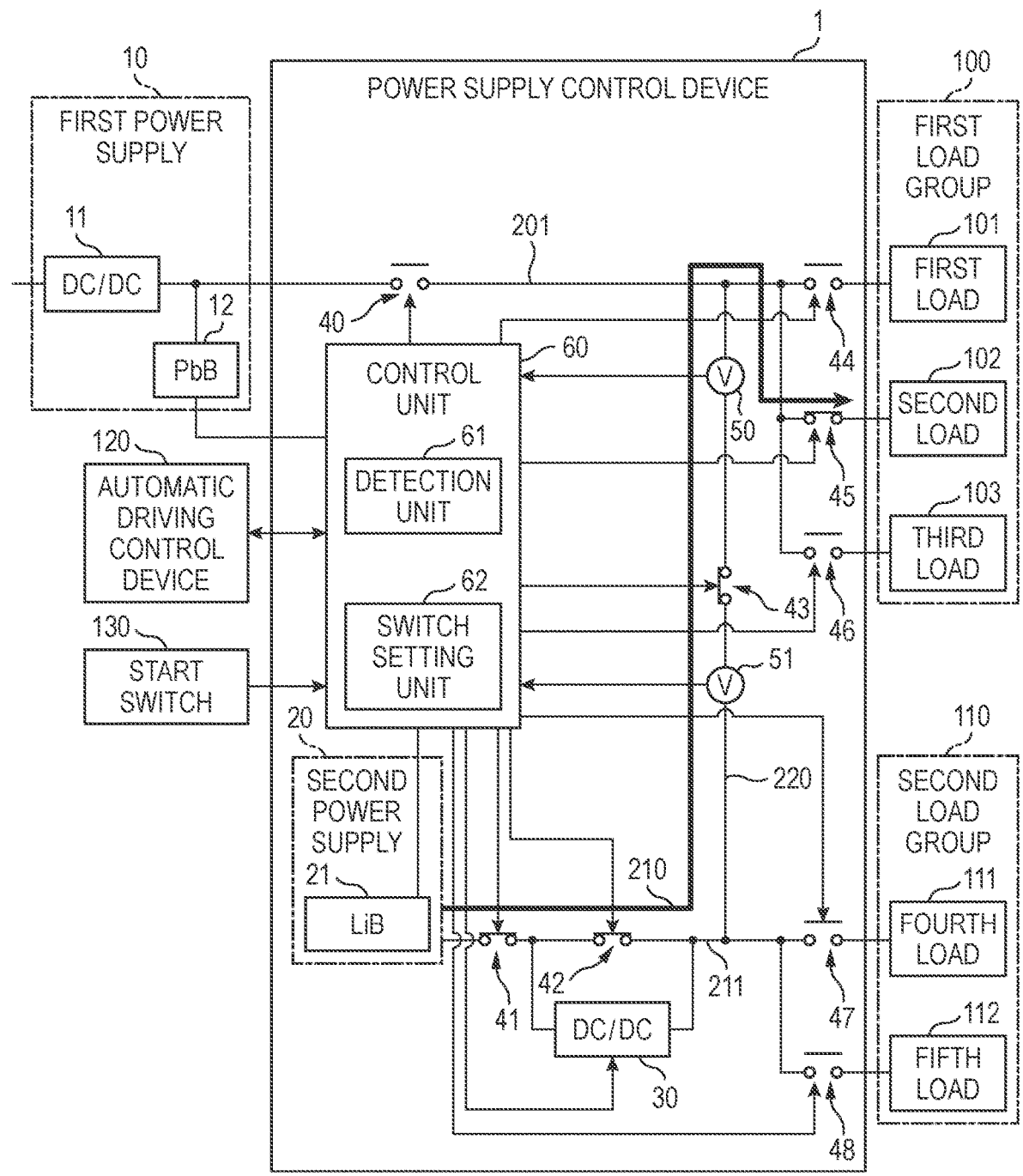
FIG. 7 is a diagram showing an electric power supply in a case where the start switch is turned off and a state of charge of the second power supply is a fifth state of charge.

When the start switch 130 is turned off and a state of charge of the second power supply 20 is the fifth state of charge, the switch setting unit 62 controls the switches 40 to 48 so that power is supplied from the second power supply 20 to the second load 102. That is, the switch setting unit 62 controls the switches 40 to 48 such that power is supplied from the second power supply 20 to the second load 102 with a higher priority among the loads that are operated during a period in which the start switch 130 is turned off. Specifically, the switch setting unit 62 turns off the first battery switch 40, the first load switch 44, the third load switch 46, the fourth load switch 47, and the fifth load switch 48. Further, the switch setting unit 62 turns on the second battery switch 41, the backup switch 42, the inter-system switch 43, and the second load switch 45. As a result, power is not supplied from the first power supply 10 to the first load group 100 and the second load group 110, as shown in FIG. 7. Power is supplied from the second power supply 20 to the second load 102 of the first load group 100. In addition, power is not supplied to the third load 103. FIG. 7 is a diagram showing a power supply in a case where the start switch 130 is turned off and a state of charge of the second power supply 20 is the fifth state of charge.

When the start switch 130 is turned off and a state of charge of the second power supply 20 is the fifth state of charge, the switch setting unit 62 controls the second load switch 45 that is a load switch and turns on the second load switch 45. The switch setting unit 62 controls the third load switch 46 and turns off the third load switch 46. As a result, power is supplied from the second power supply 20 to the second load 102 with a higher priority among the standby loads.

Figure 8:
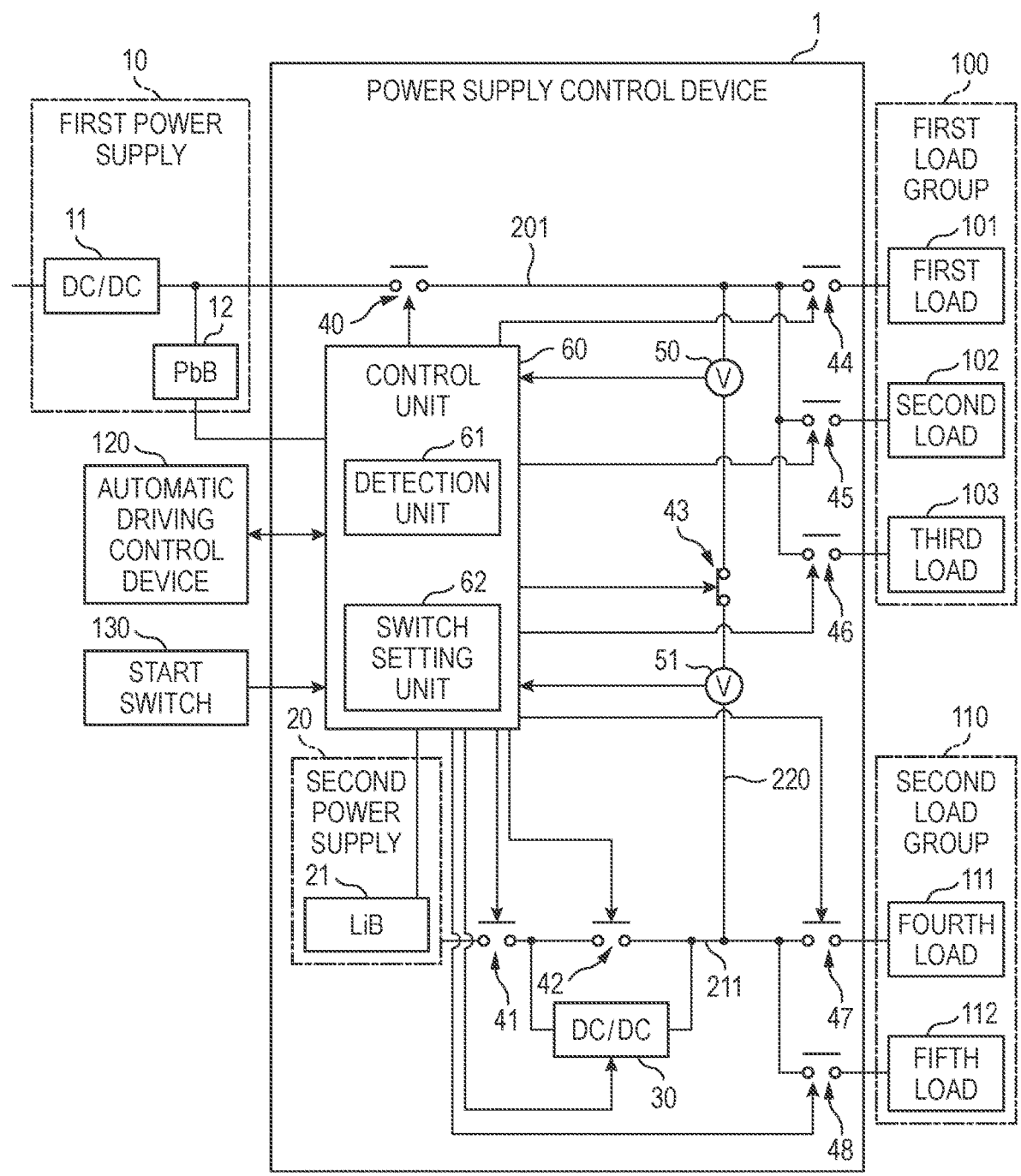
FIG. 8 is a diagram showing a state of each switch in a case where the start switch is turned off and a state of charge of the second power supply is a sixth state of charge.

When the start switch 130 is turned off and a state of charge of the second power supply 20 is the sixth state of charge, the switch setting unit 62 turns off all of the switches 40 to 48 as shown in FIG. 8. FIG. 8 is a diagram showing a state of each of the switches 40 to 48 when the start switch 130 is turned off and a state of charge of the second power supply 20 is the sixth state of charge.

Figure 9:
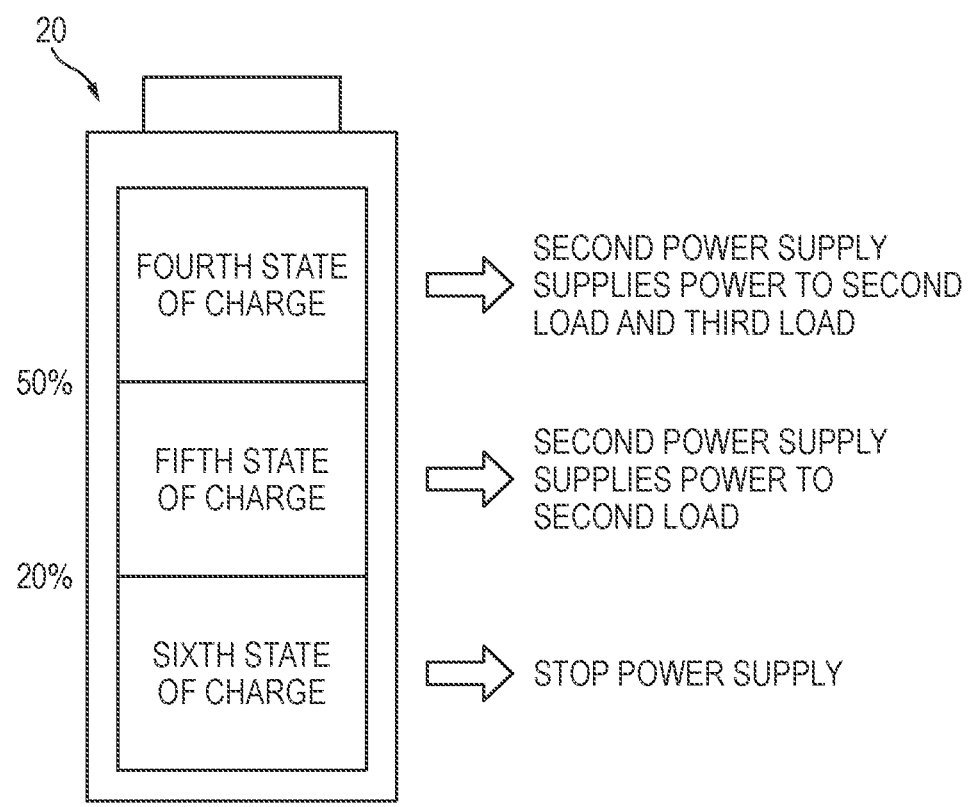
FIG. 9 is a diagram showing a relationship between a state of charge of the second power supply and an electric power supply when the start switch is turned off.

When the start switch 130 is turned off, the power supply control device 1 switches a power supply to the second load 102 and the third load 103 of the first load group 100 in accordance with a state of charge of the second power supply 20, as shown in FIG. 9. FIG. 9 is a diagram showing a relationship between a state of charge of the second power supply 20 and a power supply when the start switch 130 is turned off.

When the start switch 130 is turned off and a state of charge of the second power supply 20 is the fourth state of charge, power is supplied from the second power supply 20 to the second load 102 and the third load 103, that is, all standby loads.

When the start switch 130 is turned off and a state of charge of the second power supply 20 is the fifth state of charge, power is supplied from the second power supply 20 to the second load 102 with a higher priority among the standby loads. Power is not supplied from the second power supply 20 to the third load 103 with a lower priority.

When the start switch 130 is turned off and a state of charge of the second power supply 20 is the sixth state of charge, a power supply to all of the loads 101 to 103, 111, and 112 is stopped.

When the start switch 130 is turned off and a state of charge of the second power supply 20 is the sixth state of charge, power may be supplied from the first power supply 10 to the second load 102 and the third load 103. In this case, the second load switch 45 and the third load switch 46 may be turned on or off in accordance with a power storage capacity of the PbB 12 of the first power supply 10.

The following two control methods can be considered as a control method of the switches 40 to 48 when the start switch 130 is turned off in a similar manner to the control method of the switches 40 to 48 when a ground fault occurs in the first system 200.

In a first control method, the switch setting unit 62 determines to turn on a load switch in accordance with a state of charge of the second power supply 20 at the time when the start switch 130 is turned off, and thereafter the switch setting unit 62 maintains an ON or OFF state of each of the switches 40 to 48.

In a second control method, the switch setting unit 62 determines to turn on a load switch in accordance with a state of charge of the second power supply 20 at the time when the start switch 130 is turned off, and thereafter the switch setting unit 62 determines to turn on a load switch in accordance with a state of charge of the second power supply 20. Specifically, when a state of charge of the second power supply 20 at the time when the start switch 130 is turned off is the fourth state of charge, the switch setting unit 62 turns on the second load switch 45 and the third load switch 46. Thereafter, when a state of charge of the second power supply 20 is lowered to the fifth state of charge, the switch setting unit 62 turns on the second load switch 45 and turns off the third load switch 46, and power is supplied only to the second load 102 with a higher priority. Further, when a state of charge of the second power supply 20 is lowered to the sixth state of charge, the switch setting unit 62 turns off all of the switches 40 to 48.

Figure 10:
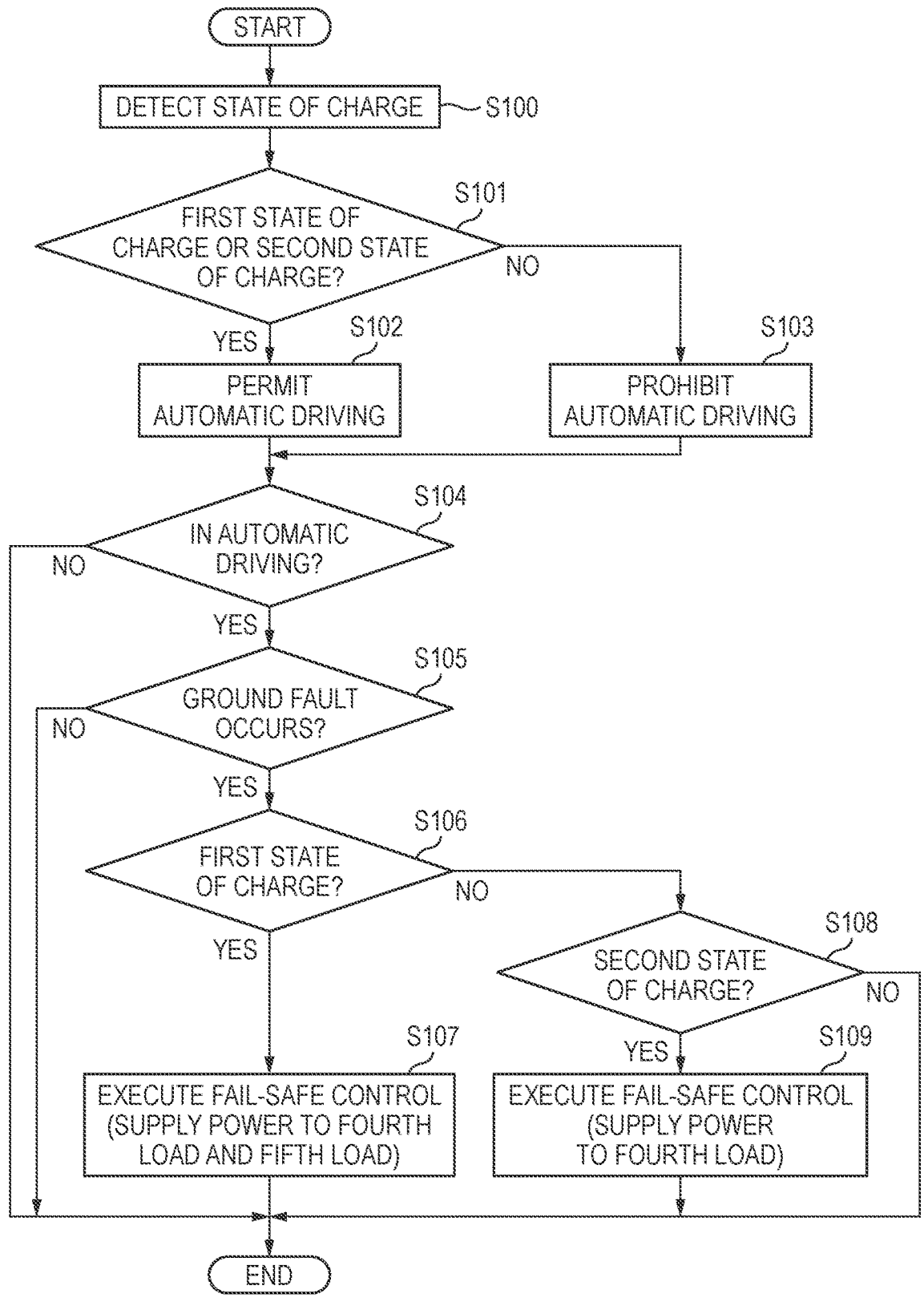
FIG. 10 is a flowchart showing a fail-safe processing when a ground fault occurs in the first system.

Next, a fail-safe processing according to the embodiment will be described with reference to FIG. 10. FIG. 10 is a flowchart showing a fail-safe processing when a ground fault occurs in the first system 200.

The power supply control device 1 detects a state of charge of the second power supply 20 (S100). The power supply control device 1 determines whether the state of charge of the second power supply 20 is the first state of charge or the second state of charge (S101).

Specifically, the power supply control device 1 determines whether a power storage capacity of the LiB 21 is equal to or larger than the first predetermined capacity. When the power storage capacity of the LiB 21 is equal to or larger than the first predetermined capacity, the power supply control device 1 determines that a state of charge of the second power supply 20 is the first state of charge. When the power storage capacity of the LiB 21 is less than the first predetermined capacity, the power supply control device 1 determines that a state of charge of the second power supply 20 is not the first state of charge.

The power supply control device 1 determines whether the power storage capacity of the LiB 21 is less than the first predetermined capacity and is equal to or larger than the second predetermined capacity. When the power storage capacity of the LiB 21 is less than the first predetermined capacity and is equal to or larger than the second predetermined capacity, the power supply control device 1 determines that a state of charge of the second power supply 20 is the second state of charge. When the power storage capacity of the LiB 21 is less than the second predetermined capacity, the power supply control device 1 determines that a state of charge of the second power supply 20 is not the second state of charge. That is, when the power storage capacity of the LiB 21 is less than the second predetermined capacity, the power supply control device 1 determines that a state of charge of the second power supply 20 is the third state of charge.

When a state of charge of the second power supply 20 is the first state of charge or the second state of charge (S101: Yes), the power supply control device 1 permits automatic driving (S102). When a state of charge of the second power supply 20 is not the first state of charge or the second state of charge (S101: No), that is, when a state of charge of the second power supply 20 is the third state of charge, the power supply control device 1 prohibits automatic driving (S103).

The power supply control device 1 determines whether the vehicle is in automatic driving (S104). When the vehicle is not in automatic driving (S104: No), the power supply control device 1 ends the current processing. When a state of charge of the second power supply 20 is the third state of charge, automatic driving is prohibited, and thus automatic driving is not started. In this case, the processing is ended without proceeding to step S105.

When the vehicle is in automatic driving (S104: Yes), the power supply control device 1 determines whether a ground fault occurs in the first system 200 (S105). Specifically, the power supply control device 1 determines whether a voltage detected by the first voltage sensor 50 is in a normal range. When the voltage detected by the first voltage sensor 50 is in the normal range, the power supply control device 1 determines that no ground fault occurs in the first system 200. When the voltage detected by the first voltage sensor 50 is not in the normal range, the power supply control device 1 determines that a ground fault occurs in the first system 200.

When no ground fault occurs in the first system 200 (S105: No), the power supply control device 1 ends the current processing.

When a ground fault occurs in the first system 200 (S105: Yes), the power supply control device 1 determines whether a state of charge of the second power supply 20 is the first state of charge (S106).

When a state of charge of the second power supply 20 is the first state of charge (S106: Yes), the power supply control device 1 supplies power from the second power supply 20 to the fourth load 111 and the fifth load 112 (S107). That is, the power supply control device 1 causes the fourth load 111 and the fifth load 112 to execute the fail-safe control of the automatic driving control. Specifically, the power supply control device 1 turns on the second battery switch 41, the backup switch 42, the fourth load switch 47, and the fifth load switch 48, and turns off the first battery switch 40 and the inter-system switch 43.

When a state of charge of the second power supply 20 is not the first state of charge (S106: No), the power supply control device 1 determines whether a state of charge of the second power supply 20 is the second state of charge (S108).

When a state of charge of the second power supply 20 is the second state of charge (S108: Yes), the power supply control device 1 supplies power from the second power supply 20 to the fourth load 111 (S109). That is, the power supply control device 1 causes the fourth load 111 to execute the fail-safe control. Specifically, the power supply control device 1 turns on the second battery switch 41, the backup switch 42, and the fourth load switch 47, and turns off the first battery switch 40, the inter-system switch 43, and the fifth load switch 48.

When a state of charge of the second power supply 20 is not the second state of charge (S108: No), that is, when a state of charge of the second power supply 20 is the third state of charge, the power supply control device 1 ends the current processing.

In a case where a ground fault occurs during automatic driving, when a state of charge of the second power supply 20 is the first state of charge or the second state of charge and then a state of charge of the second power supply 20 changes to the third state of charge, the automatic driving is prohibited (S103). Since the automatic driving has already been performed, it is determined in step S104 that the vehicle is in automatic driving (104: Yes). Then, the fail-safe control executed by the fourth load 111 set in step S109 in a previous processing is continued.

When a ground fault occurs in the first system 200 and a state of charge of the second power supply 20 changes from the first state of charge to the second state of charge, the power supply control device 1 switches the fifth load switch 48 from ON to OFF. That is, when a ground fault occurs in the first system 200, a state of charge of the second power supply 20 is lowered from a state in which power is supplied from the second power supply 20 to the fourth load 111 and the fifth load 112, and a state of charge of the second power supply 20 changes from the first state of charge to the second state of charge, the fifth load switch 48 is turned off.

Figure 11:
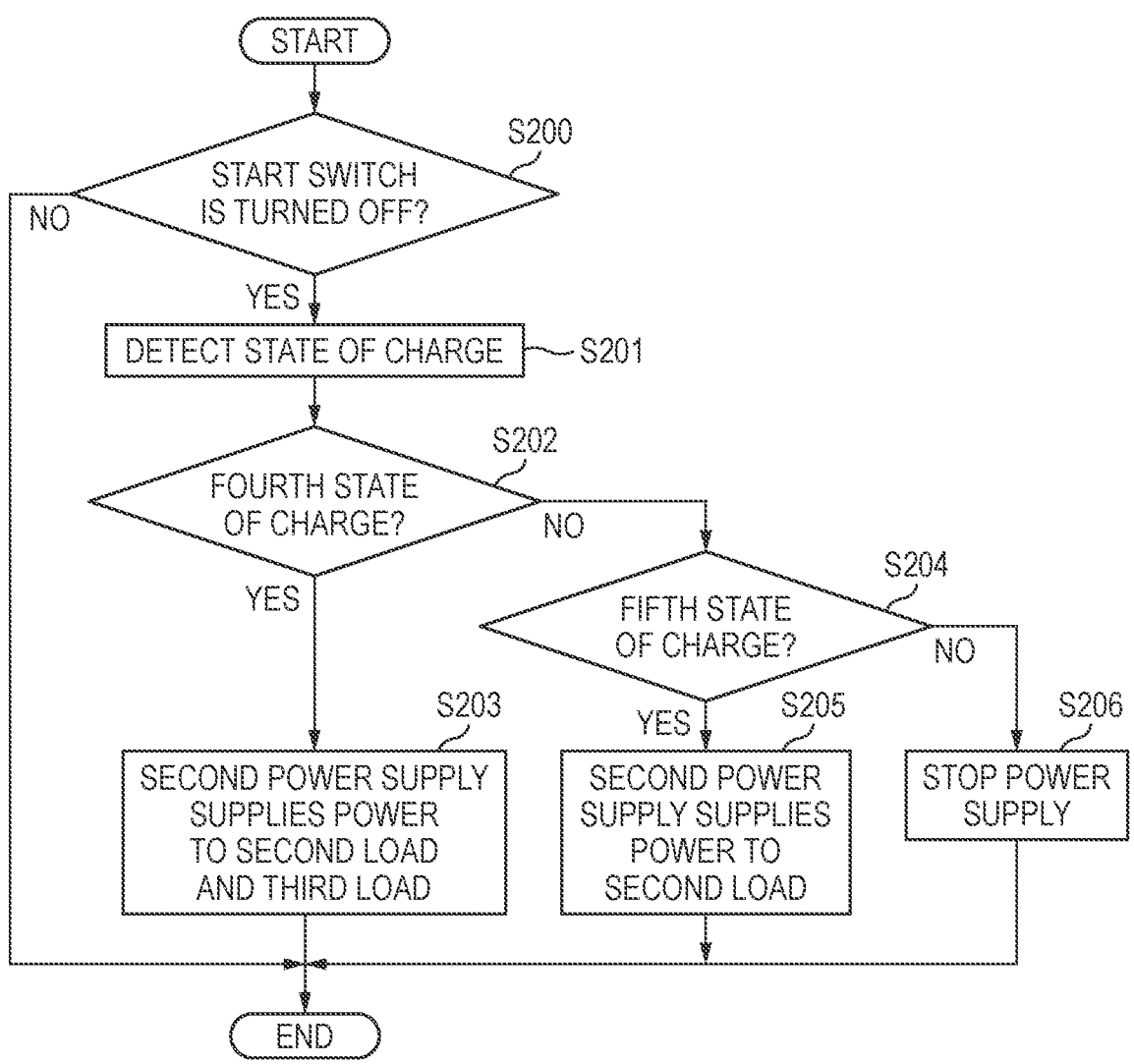
FIG. 11 is a flowchart showing a standby processing when the start switch is turned off.

Next, a standby processing according to the embodiment will be described with reference to FIG. 11. FIG. 11 is a flowchart showing a standby processing when the start switch 130 is turned off.

The power supply control device 1 determines whether the start switch 130 is turned off (S200). When the start switch 130 is not turned off (S200: No), the power supply control device 1 ends the current processing.

When the start switch 130 is turned off (S200: Yes), the power supply control device 1 detects a state of charge of the second power supply 20 (S201).

The power supply control device 1 determines whether a state of charge of the second power supply 20 is the fourth state of charge (S202). Specifically, the power supply control device 1 determines whether a power storage capacity of the LiB 21 is equal to or larger than the third predetermined capacity. When the power storage capacity of the LiB 21 is equal to or larger than the third predetermined capacity, the power supply control device 1 determines that a state of charge of the second power supply 20 is the fourth state of charge. When the power storage capacity of the LiB 21 is less than the third predetermined capacity, the power supply control device 1 determines that a state of charge of the second power supply 20 is not the fourth state of charge.

When a state of charge of the second power supply 20 is the fourth state of charge (S202: Yes), the power supply control device 1 supplies power from the second power supply 20 to the second load 102 and the third load 103, that is, all standby loads (S203). Specifically, the power supply control device 1 turns on the second battery switch 41, the backup switch 42, the inter-system switch 43, the second load switch 45, and the third load switch 46. The power supply control device 1 turns off the first battery switch 40, the first load switch 44, the fourth load switch 47, and the fifth load switch 48.

When a state of charge of the second power supply 20 is not the fourth state of charge (S202: No), the power supply control device 1 determines whether a state of charge of the second power supply 20 is the fifth state of charge (S204). Specifically, the power supply control device 1 determines whether the power storage capacity of the LiB 21 is less than the third predetermined capacity and is equal to or larger than the fourth predetermined capacity. When the power storage capacity of the LiB 21 is less than the third predetermined capacity and is equal to or larger than the fourth predetermined capacity, the power supply control device 1 determines that a state of charge of the second power supply 20 is the fifth state of charge. When the power storage capacity of the LiB 21 is less than the fourth predetermined capacity, the power supply control device 1 determines that a state of charge of the second power supply 20 is not the fifth state of charge. That is, when the power storage capacity of the LiB 21 is less than the fourth predetermined capacity, the power supply control device 1 determines that a state of charge of the second power supply 20 is the sixth state of charge.

When a state of charge of the second power supply 20 is the fifth state of charge (S204: Yes), the power supply control device 1 supplies power from the second power supply 20 to the second load 102 with a higher priority among the standby loads (S205). Specifically, the power supply control device 1 turns on the second battery switch 41, the backup switch 42, the inter-system switch 43, and the second load switch 45. The power supply control device 1 turns off the first battery switch 40, the first load switch 44, the third load switch 46, the fourth load switch 47, and the fifth load switch 48.

When a state of charge of the second power supply 20 is not the fifth state of charge (S204: No), that is, when a state of charge of the second power supply 20 is the sixth state of charge, the power supply control device 1 stops a power supply from the second power supply 20 to all of the loads 101 to 103, 111, and 112 (S206). Specifically, the power supply control device 1 turns off all of the switches 40 to 48. The power supply control device 1 may turn off the first battery switch 40 and the second battery switch 41 and turn on at least one of the switches 42 to 48.

When the start switch 130 is turned off and a state of charge of the second power supply 20 changes from the fourth state of charge to the fifth state of charge, the power supply control device 1 switches the third load switch 46 from ON to OFF. When the start switch 130 is turned off, a state of charge of the second power supply 20 is lowered from a state in which power is supplied from the second power supply 20 to the second load 102 and the third load 103, and a state of charge of the second power supply 20 changes from the fourth state of charge to the fifth state of charge, the third load switch 46 is turned off.

When the start switch 130 is turned off and a state of charge of the second power supply 20 changes from the fifth state of charge to the sixth state of charge, the power supply control device 1 may supply power from the first power supply 10 to the second load 102 instead of a power supply from the second power supply 20. In this case, the first battery switch 40 is turned on, and the second battery switch 41 and the inter-system switch 43 are turned off.

The power supply control device 1 includes the first system 200, the second system 210, a plurality of switches (load switches) 44 to 48, and the control unit 60. The first system 200 can supply power from the first power supply 10 to the first load group 100. The second system 210 can supply power from the second power supply 20 to the second load group 110. The plurality of switches 44 to 48 can switch a power supply to each of the loads 101 to 103, 111, and 112 in the first load group 100 and the second load group 110. The control unit 60 controls the plurality of switches 44 to 48 such that power is supplied from the second power supply 20 to the loads (backup loads) 101 to 103, 111, and 112 included in at least one of the first load group 100 and the second load group 110 in a predetermined backup state. The control unit 60 detects a state of charge of the second power supply 20, and increases the number of the switches 44 to 48 to be connected as a state of charge is higher in the predetermined backup state.

As a result, the power supply control device 1 can supply power from the second power supply 20 to the loads 101 to 103, 111, and 112 in accordance with a state of charge of the second power supply 20. Therefore, the power supply control device 1 can increase an operation time of each of the loads 101 to 103, 111, and 112. For example, when a state of charge of the second power supply 20 is lower, the power supply control device 1 reduces the number of loads 101 to 103, 111, and 112 supplied with power from the second power supply 20 in a predetermined backup state. Therefore, the power supply control device 1 can increase an operation time of each of the loads 101 to 103, 111, and 112 using power supplied from the second power supply 20.

The predetermined backup state includes a state in which a ground fault occurs in the first system 200.

As a result, when a ground fault occurs in the first system 200, the power supply control device 1 can change the number of loads 111 and 112 that are operated by being supplied with power from the second power supply 20 in accordance with a state of charge of the second power supply 20. Therefore, when a ground fault occurs in the first system 200 and a state of charge of the second power supply 20 is higher, the power supply control device 1 can operate many loads 111 and 112 to execute a fail-safe control of an automatic driving control. When a ground fault occurs in the first system 200 and a state of charge of the second power supply 20 is lower, the power supply control device 1 can reduce the number of loads to be operated and increase an operation time of the load 112 to be operated.

The power supply control device 1 includes the inter-system switch 43. The inter-system switch 43 connects or disconnects the first system 200 and the second system 210. The control unit 60 causes the inter-system switch 43 to disconnect the first system 200 and the second system 210 in a state in which a ground fault occurs in the first system 200. When a state of charge of the second power supply 20 is the first state of charge, the control unit 60 controls the fourth load switch 47 and the fifth load switch 48 in a state in which a ground fault occurs in the first system 200. The control unit 60 controls the fourth load switch 47 and the fifth load switch 48 such that power is supplied from the second system 210 to the fourth load 111 and the fifth load 112. When a state of charge of the second power supply 20 is the second state of charge that is lower than the first state of charge, the control unit 60 controls the fourth load switch 47 and the fifth load switch 48 in a state in which a ground fault occurs in the first system 200. The control unit 60 controls the fourth load switch 47 and the fifth load switch 48 such that power is supplied from the second power supply 20 to the fourth load 111 with a higher priority.

As a result, when a state of charge of the second power supply 20 is the first state of charge and a ground fault occurs in the first system 200, the power supply control device 1 can supply power from the second power supply 20 to the fourth load 111 and the fifth load 112. Therefore, the power supply control device 1 can operate the fourth load 111 and the fifth load 112 to execute the fail-safe control of the automatic driving control. When a state of charge of the second power supply 20 is the second state of charge and a ground fault occurs in the first system 200, the power supply control device 1 supplies power from the second power supply 20 only to the fourth load 111 with a higher priority. As a result, when a state of charge of the second power supply 20 is the second state of charge and a ground fault occurs in the first system 200, the power supply control device 1 can increase an operation time of the fourth load 111. Therefore, the power supply control device 1 can reliably execute the fail-safe control of the automatic driving control. When a ground fault occurs in the first system 200, the power supply control device 1 can move the vehicle to a safe place by the fail-safe control of the automatic driving control.

When a ground fault occurs in the first system 200 and a state of charge of the second power supply 20 changes from the first state of charge to the second state of charge, the control unit 60 disconnects the fifth load switch 48 for supplying power to the fifth load 112 with a lower priority.

As a result, the power supply control device 1, when a state of charge of the second power supply 20 is lower, can suppress shortening of a time of a power supply from the second power supply 20 to the fourth load 111. Therefore, the power supply control device 1 can increase an operation time of the fourth load 111.

When a state of charge of the second power supply 20 is the first state of charge or the second state of charge, the control unit 60 permits a control to be executed by the fourth load 111 or by the fourth load 111 and the fifth load 112. When a state of charge of the second power supply 20 is the third state of charge that is lower than the second state of charge, the control unit 60 prohibits a control to be executed by the fourth load 111 and the fifth load 112.

As a result, the power supply control device 1 can prevent the fail-safe control of the automatic driving control from being started when a state of charge of the second power supply 20 is the third state of charge.

The predetermined backup state includes a state in which the start switch 130 of a power supply system is turned off.

As a result, when the start switch 130 is turned off, the power supply control device 1 can change the number of the loads 102 and 103 that are operated by being supplied with power from the second power supply 20 in accordance with a state of charge of the second power supply 20. Therefore, when the start switch 130 is turned off and a state of charge of the second power supply 20 is higher, the power supply control device 1 can suppress a decrease in a power storage capacity of the first power supply 10 and operate the second load 102 and the third load 103 using a power supply from the second power supply 20. When the start switch 130 is turned off and a state of charge of the second power supply 20 is lower, the power supply control device 1 can suppress a decrease in a power storage capacity of the second power supply 20 by operating the second load 102 only. That is, the power supply control device 1 can increase an operation time of the second load 102 using power supplied from the second power supply 20.

When the start switch 130 is turned off and a state of charge of the second power supply 20 is the fourth state of charge, the control unit 60 controls the second load switch 45 and the third load switch 46. The control unit 60 controls the second load switch 45 and the third load switch 46 such that power is supplied from the second system 210 to the second load 102 and the third load 103 (all standby loads). When the start switch 130 is turned off and a state of charge of the second power supply 20 is the fifth state of charge that is lower than the fourth state of charge, the control unit 60 controls the second load switch 45 and the third load switch 46. The control unit 60 controls the second load switch 45 and the third load switch 46 such that power is supplied from the second power supply 20 to the second load 102 with a higher priority between the second load 102 and the third load 103.

As a result, when the start switch 130 is turned off and a state of charge of the second power supply 20 is lower, the power supply control device 1 can operate the second load 102 and the third load 103 using power supplied from the second power supply 20. Therefore, the power supply control device 1 can suppress a decrease in a power storage capacity of the first power supply 10. When the start switch 130 is turned off and a state of charge of the second power supply 20 is lower, the power supply control device 1 can suppress a decrease in a power storage capacity of the second power supply 20 by operating only the second load 102 with a higher priority. That is, the power supply control device 1 can increase an operation time of the second load 102 using power supplied from the second power supply 20.

When the start switch 130 is turned off and a state of charge of the second power supply 20 changes from the fourth state of charge to the fifth state of charge, the control unit 60 disconnects the third load switch 46 for supplying power to the third load 103. The control unit 60 disconnects the third load switch 46 for supplying power to the third load 103 with a lower priority between the second load 102 and the third load 103.

As a result, when the start switch 130 is turned off and a state of charge of the second power supply 20 is lower, the power supply control device 1 can stop a power supply to the third load 103 with a lower priority. Therefore, the power supply control device 1 can increase an operation time of the second load 102 using power supplied from the second power supply 20.

When the start switch 130 is turned off and a state of charge of the second power supply 20 is the sixth state of charge that is lower than the fifth state of charge, the control unit 60 controls the plurality of load switches such that to the power is not supplied to the second load 102 and the third load 103.

As a result, the power supply control device 1 can suppress a voltage drop of the second power supply 20 and a voltage drop of the first power supply 10. Therefore, the power supply control device 1 can shorten a period during which a backup control cannot be executed until the LiB 21 of the second power supply 20 is charged after the start switch 130 is turned on.

When the start switch 130 is turned off and a state of charge of the second power supply 20 is the sixth state of charge that is lower than the fifth state of charge, the control unit 60 controls the second load switch 45 and the third load switch 46. The control unit 60 controls the second load switch 45 and the third load switch 46 such that power is supplied from the first power supply 10 to the second load 102 with a higher priority between the second load 102 and the third load 103.

As a result, the power supply control device 1 can continue the operation of the second load 102 even when the start switch 130 is turned off and a state of charge of the second power supply 20 is lowered.

The power supply control device 1 may be capable of executing any one of the fail-safe processing and the standby processing.

At least one of the first load 101 to the fifth load 112 may be further divided into a plurality of loads. In this case, a switch for switching a power supply to each load is provided corresponding to each load. Each load is provided with a priority, and each switch is controlled based on a state of charge of the second power supply 20 and the priority in the fail-safe processing or the standby processing.

In addition, one of the recognition system loads such as the in-vehicle camera and the radar may be set as the fourth load 111, and the other one may be set as the fifth load 112. As a result, when a state of charge of the second power supply 20 is the second state of charge, the fail-safe control can be executed using the recognition system load included in the fourth load 111. That is, even when a state of charge of the second power supply 20 is lower, the vehicle can reliably retreat to a safe place by the fail-safe control.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCE SIGNS LIST 1. power supply control device
10. first power supply
20. second power supply
43. inter-system switch
44. first load switch
45. second load switch
46. third load switch
47. fourth load switch
48. fifth load switch
60. control unit
61. detection unit
62. switch setting unit
100. first load group
101. first load
102. second load (backup load, standby load)
103. third load (backup load, standby load)
110. second load group
111. fourth load (backup load)
112. fifth load (backup load)
130. start switch
200. first system
210. second system
220. connection line

What is claimed is:

1. A power supply control device comprising:
a first system configured to supply electric power from a first power supply to a first load group;
a second system configured to supply electric power from a second power supply to a second load group;
a plurality of load switches configured to respectively switch an electric power supply to each load of the first load group and the second load group;
an inter-system switch that connects or disconnects the first system and the second system; and
at least one processor configured to control the plurality of load switches such that electric power is supplied from the second power supply to a backup load included in at least one of the first load group and the second load group in a predetermined backup state, the predetermined backup state including a state in which a ground fault occurs in the first system,
wherein the at least one processor
detects a state of charge of the second power supply;
increases, in the predetermined backup state, a number of the load switches to be connected as the state of charge is higher;
causes the inter-system switch to disconnect the first system and the second system in the state in which the ground fault occurs;
controls, when the state of charge is a first state of charge, the plurality of load switches such that electric power is supplied from the second power supply to all backup loads included in the second load group in the state in which the ground fault occurs; and
controls, when the state of charge is a second state of charge that is lower than the first state of charge, the plurality of load switches such that electric power is supplied from the second power supply to a backup load with a higher priority among the backup loads included in the second load group in the state in which the ground fault occurs.

2. The power supply control device according to claim 1, wherein the at least one processor disconnects the load switch for switching an electric power supply to a backup load with a lower priority when the state of charge changes from the first state of charge to the second state of charge in the state in which the ground fault occurs.

3. The power supply control device according to claim 2, wherein the at least one processor permits a control to be executed by a backup load when the state of charge is the first state of charge or the second state of charge, and prohibits a control to be executed by the backup load when the state of charge is a third state of charge that is lower than the second state of charge.

4. The power supply control device according to claim 1, wherein the at least one processor permits a control to be executed by a backup load when the state of charge is the first state of charge or the second state of charge, and prohibits a control to be executed by the backup load when the state of charge is a third state of charge that is lower than the second state of charge.

5. The power supply control device according to claim 1, wherein the predetermined backup state includes a state in which a start switch of a power supply system is turned off.

6. The power supply control device according to claim 5, wherein the at least one processor
controls the plurality of load switches such that electric power is supplied from the second power supply to all standby loads among the backup loads when the start switch is turned off and the state of charge is a fourth charge state, and
controls the plurality of load switches such that electric power is supplied from the second power supply to a standby load with a higher priority among the standby loads when the start switch is turned off and the state of charge is a fifth state of charge that is lower than the fourth charge state.

7. The power supply control device according to claim 6, wherein the at least one processor disconnects the load switch for supplying electric power to a standby load with a lower priority when the start switch is turned off and the state of charge changes from the fourth charge state to the fifth state of charge.

8. The power supply control device according to claim 7, wherein the at least one processor controls the plurality of load switches such that electric power is not supplied to the standby load when the start switch is turned off and the state of charge is a sixth state of charge that is lower than the fifth state of charge.

9. The power supply control device according to claim 7, wherein the at least one processor controls the plurality of load switches such that electric power is supplied from the first power supply to a standby load with a higher priority among the standby loads when the start switch is turned off and the state of charge is a sixth state of charge that is lower than the fifth state of charge.

10. The power supply control device according to claim 6, wherein the at least one processor controls the plurality of load switches such that electric power is not supplied to the standby load when the start switch is turned off and the state of charge is a sixth state of charge that is lower than the fifth state of charge.

11. The power supply control device according to claim 6, wherein the at least one processor controls the plurality of load switches such that electric power is supplied from the first power supply to a standby load with a higher priority among the standby loads when the start switch is turned off and the state of charge is a sixth state of charge that is lower than the fifth state of charge.

12. A control method of a power supply control device, the power supply control device including (i) a first system configured to supply electric power from a first power supply to a first load group, (ii) a second system configured to supply electric power from a second power supply to a second load group, (iii) a plurality of load switches configured to respectively switch an electric power supply to each load of the first load group and the second load group, and (iv) an inter-system switch that connects or disconnects the first system and the second system, the control method comprising:
controlling the plurality of load switches such that electric power is supplied from the second power supply to a backup load included in the first load group or the second load group in a predetermined backup state, the predetermined backup state including a state in which a ground fault occurs in the first system;
detecting a state of charge of the second power supply;
increasing, in the predetermined backup state, a number of the load switches to be connected as the state of charge is higher;
causing the inter-system switch to disconnect the first system and the second system in the state in which the ground fault occurs;
controlling, when the state of charge is a first state of charge, the plurality of load switches such that electric power is supplied from the second power supply to all backup loads included in the second load group in the state in which the ground fault occurs; and
controlling, when the state of charge is a second state of charge that is lower than the first state of charge, the plurality of load switches such that electric power is supplied from the second power supply to a backup load with a higher priority among the backup loads included in the second load group in the state in which the ground fault occurs.

13. A power supply control device comprising:
a first system configured to supply electric power from a first power supply to a first load group;
a second system configured to supply electric power from a second power supply to a second load group;
a plurality of load switches configured to respectively switch an electric power supply to each load of the first load group and the second load group; and
at least one processor configured to control the plurality of load switches such that electric power is supplied from the second power supply to a backup load included in at least one of the first load group and the second load group in a predetermined backup state,
wherein the predetermined backup state includes a state in which a start switch of a power supply system is turned off, and
wherein the at least one processor
detects a state of charge of the second power supply, and
increases, in the predetermined backup state, a number of the load switches to be connected as the state of charge is higher.

* * * * *